US006688888B1

(12) United States Patent
Ho et al.

(10) Patent No.: US 6,688,888 B1
(45) Date of Patent: *Feb. 10, 2004

(54) COMPUTER-AIDED LEARNING SYSTEM AND METHOD

(76) Inventors: Chi Fai Ho, 4816 Cabello Ct., Union City, CA (US) 94587; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

This patent is subject to a terminal disclaimer.

(21) Appl. No.: 09/656,390

(22) Filed: Sep. 6, 2000

Related U.S. Application Data

(63) Continuation of application No. 09/037,768, filed on Mar. 10, 1998, now Pat. No. 6,139,330, which is a continuation-in-part of application No. 08/618,193, filed on Mar. 19, 1996, now Pat. No. 5,779,486, which is a continuation-in-part of application No. 08/633,582, filed on Apr. 17, 1996, now Pat. No. 5,743,746, which is a continuation-in-part of application No. 08/664,023, filed on May 28, 1996, now Pat. No. 5,727,951, which is a continuation-in-part of application No. 08/675,391, filed on Jul. 2, 1996, now Pat. No. 5,863,208, which is a continuation-in-part of application No. 08/707,189, filed on Sep. 3, 1996, now Pat. No. 5,743,743.

(51) Int. Cl.[7] .................................................. G09B 7/00
(52) U.S. Cl. ...................... 434/322; 434/323; 434/332; 434/353; 434/362
(58) Field of Search .............................. 434/236, 322, 434/323, 332, 353, 362

(56) References Cited

U.S. PATENT DOCUMENTS

| 4,611,996 A | 9/1986 | Stoner .......................... 434/202 |
| 4,705,479 A | 11/1987 | Maron ........................... 434/335 |
| 4,798,543 A | 1/1989 | Spiece .......................... 434/323 |
| 4,867,685 A | 9/1989 | Brush et al. ................. 434/234 |
| 4,926,255 A | 5/1990 | Von Kohorn ................ 725/23 |
| 5,002,491 A | 3/1991 | Abrahamson et al. |
| 5,035,625 A | 7/1991 | Monson et al. ............. 434/332 |
| 5,168,372 A | 12/1992 | Sweetser ...................... 725/29 |
| 5,173,051 A | 12/1992 | May et al. .................... 434/118 |
| 5,286,036 A | 2/1994 | Barabash ...................... 273/429 |
| 5,302,132 A | 4/1994 | Corder |
| 5,306,154 A | 4/1994 | Ujita et al. .................. 434/218 |
| 5,316,485 A | 5/1994 | Hirose .......................... 434/322 |
| 5,326,270 A | 7/1994 | Ostby et al. ................. 434/362 |
| 5,387,104 A | 2/1995 | Corder ......................... 704/270 |
| 5,411,271 A | 5/1995 | Mirando ......................... 463/9 |
| 5,418,717 A | 5/1995 | Su et al. ......................... 704/9 |
| 5,434,562 A | 7/1995 | Reardon ...................... 713/200 |

(List continued on next page.)

FOREIGN PATENT DOCUMENTS

| JP | 08196741 | 8/1996 |
| WO | WO 98/30965 | 7/1998 |

OTHER PUBLICATIONS

Computer–assisted instruction at Stanford, 1966–68 By Suppes et al, Academic Press 1972.
Control Data Plato, System Overview by Control Data Corporation 1976.

(List continued on next page.)

*Primary Examiner*—John Edmund Rovnak
(74) *Attorney, Agent, or Firm*—Peter Tong

(57) ABSTRACT

A computer-aided learning method and apparatus based on a super-recommendation generator, which is configured to assess a user's or a student's understanding in a subject, reward the user who has reached one or more milestones in the subject, further the user's understanding in the subject through relationship learning, reinforce the user's understanding in the subject through reviews, and restrict the user from enjoying entertainment materials under certain condition, with the entertainment materials requiring a device to fulfill its entertainment purpose. The generator does not have to be configured to perform all of the above functions.

35 Claims, 1 Drawing Sheet

U.S. PATENT DOCUMENTS

| | | | |
|---|---|---|---|
| 5,458,494 A | 10/1995 | Krohn et al. | |
| 5,494,444 A | 2/1996 | Thayer et al. | 434/362 |
| 5,506,984 A | 4/1996 | Miller | 707/10 |
| 5,592,375 A | 1/1997 | Salmon et al. | |
| 5,597,312 A | 1/1997 | Bloom et al. | 434/362 |
| 5,616,033 A | 4/1997 | Kerwin | 434/118 |
| 5,618,182 A | 4/1997 | Thomas | 434/323 |
| 5,657,256 A | 8/1997 | Swanson et al. | 702/119 |
| 5,681,170 A | 10/1997 | Rieber et al. | 434/355 |
| 5,692,906 A | 12/1997 | Corder | 434/156 |
| 5,727,950 A | 3/1998 | Cook et al. | 434/350 |
| 5,754,939 A | 5/1998 | Herz et al. | 455/3.04 |
| 5,794,178 A | 8/1998 | Caid et al. | 704/9 |
| 5,978,768 A | 11/1999 | McGovern et al. | |
| 5,999,908 A | 12/1999 | Abelow | |
| 6,139,330 A * | 10/2000 | Ho et al. | 434/322 |

OTHER PUBLICATIONS

Control Data Plato CMI Author's Guide By Control Data Corporation 1978.

Control Data Plato, Author Language Reference Manual By Control Data Corporation Apr. 1978.

CDC Philosophy By Control Data Corporation.

A computerized model for placement and diagnostic testing in college remedial mathematics, A Florida Atlantic University Disertation by Iraj Hirmanpour Dec. 1980.

Industry Education Computer Based Training Strategy By Arthur Andersen & Co. Feb. 1988.

Teacher's Handbook for Math Concepts and Skills Computer Curriculum Corporation By Agulnick et al. 1991.

CBT Systems By The Training Resource 1992.

CBT Systems By The Training Resource 1993.

SuccessMaker Reports Guide by Computer Curriculum Corporation 1993.

SuccessMaker Reports Quick Reference Guide By Computer Curriculum Corporation 1993.

SuccessMaker Instructional Management by Computer Curriculum Corporation 1993.

SuccessMaker Math Concepts and Skills by Computer Curriculum Corporation 1993.

User's Guide for Success Maker by Computer Curriculum Corporation .

How to use the CBT Tracs System Administrator's Guide by CBT Systems Ltd. 1994.

CBT Wintracs by CBT Systems Ltd 1994.

Full Curriculum Software personal selection help EISI Software Institute Jan. 1994.

CBT Systems by The Training Resource Spring 1995.

The development of a health careers database computer program, A University of Houston Dissertation By Ava Miller May 1995.

Knowledge Management Case Study, Knowledge Management at Microsoft, 1997 By Thomas Davenport 1996.

Wintracs by CBT Systems Ltd Sep. 1997.

Teltech: The business of knowledge management case study By Thomas Davenport.

SkillView: Engineering a More Productive WorkForce by SkillView Technologies.

Computer based training by J. Patrick—a report of a NATO study visit to America. A.P. Report Jan. 1980.

Improving the Selection, classification, and utilization of army enlisted personnel: Annual Report synopsis, 1984 Fiscal Year, Human Resources Research Organization, Alexandria, Va. Jul. 1985.

Mendel: An Intelligent Computer Tutoring System For Genetics Problem–Solving, Conjecturing, and Understanding by Streibel et al. Machine–Mediated Learning, vol. 2, No. 1 & 2 1987.

Getting Serious about SAT software By Harvey et al. National Council of Teachers of Mathematics Sep. 1987.

Control for Intelligent Tutoring Systems: A Comparison of Blackboard Architectures and Discourse Management Networks, by W. Murray. Machine–Mediated Learning, vol. 3, No. 1 1989.

Taking a standardized test? Here's some help. By M. Bunescu, 62 Electronic Learning Sep. 1989.

ECAL: Bridging the gap between CAL and Intelligent tutoring systems. By Elsom–Cook et al. Computers & Education, vol. 15, No. 1–3 1990.

A blackboard–based dynamic instructional planner By W. Murray. Artificial Intelligence Center, FMC Corp., ONR–6376 Feb. 1990.

Test–taking skills. School library journal May 1990.

An architecture and methodology for creating a domain-independent, plan–based intelligent tutoring system. By J. Vassileva. Educational & Training Technology International, vol. 27, #4 Nov. 1990.

Software. Media & Methods Nov.–Dec. 1990.

Toward the design of an intelligent courseware production system using software engineering and instructional design principles. By Chen et al., Educational Technology Systems Dec. 1990.

Advanced technology training program for the apparel industry. Final report. Office of vocational an adult education (ED), Washington, CD 1991.

An analysis of computer–assisted instruction on scholastic aptitude test performance of rural high school students. By Fine et al. Education, vol. 111, No. 3, p. 400–403 Spring 1991.

Building integrated skills—a model for action. BC Construction industry skills improvement council 404–737 Carnarvon Street, New Westminster, British Columbia V3M 5X1 Aug. 1991.

Computer software. By Herne et al. Journal of Reading Apr. 1992.

Designing a Tool Supporting the Development of ITS in Different Domains: The Docet Experience. By Bonarini et al., Interactive Learning Environments vol. 3, No. 2 1993.

Databases on vocational qualifications an courses accredited European centre for the development of vocational training. Berlin (Germany) Feb. 1993.

An approach to developing intelligent tutors in Mathematics Computers & Education. By H. Nwana. Feb. 1993.

An historical perspective and a model for evaluation of intelligent tutoring systems. By Seidel et al., J. Educational Computing Research, vol. 10(2)103–128 1994.

A new direction for developmental education using technology. Annual convention of the American association of community colleges ($74^{th}$, Washington, DC, Apr. 6–9, 1994) Apr. 1994.

Mathematics study skills: A must for students with LD. By P. Nolting. Intervention in shcool and clinic, vol. 30, #1 Sep. 1994.

Keeping up with the SATs. By R. Schneider. Technology and learning Sep. 1994.

Using computer technology to monitor student progress and remediate reading problems. By C. McCullough. School psychology review, vol. 24, No. 3, pp. 426–439 1995.

Software and Courseware The Technological Horizons in Education Journal vol. 22, No. 10 May 1995.

Gearing up for the SAT. By R. Schneider. Technology Learning Jan. 1996.

Basic Skills Program Helps Trainees Pass Vocational Tests The Technological Horizons in Education Journal vol. 23, No. 8 Mar. 1996.

Foundations of Probability with applications, selected papers 1974–1975, pp. 149–188. By Suppes et al. Nov. 1996.

SAT preparation through technology. By Bean et al. Media & Methods, p. 73 Nov.–Dec. 1996.

Computers in school: a loser? Or a lost opportunity? By Shao et al., Business Week, No. 3115, p. 108 Jul. 17, 1989.

Is it a "miracle"? Computer teaches piano Consumer reports, v. 56, No. 11, p. 718, Nov. 1991.

Kids love to learn with these PC games By Warner et al. Business week, No. 3265, p. 116 May 11, 1992.

Software that's fun and educational—that's "edutainment" By C. Miller. American marketing association, Marketing News, p. 2 Apr. 26, 1993.

Test drive; comic relief helps navigate hallways of "Inside the SAT" by E. Graner. St Louis Post–Disptach, Everyday magazine, p. 1F Mar. 8, 1995.

SAT fundamentals By D. Oldenburg. The Washington Post, p. D05, Final Eidtion Apr. 7, 1995.

SAT Software: Does it work? By R. Calem. The New York Times. Section C, p. 2, col. 1, Late Edition—Final. Apr. 27, 1995.

Software spells out the ABC's of SAT By R. Calem. The Tampa Tribune, Baylife, p. 1, Final edition May 3, 1995.

CD–ROM helps prepare for SAT By J. Gaw. The Plain Dealer, Next, p. 1E, Final May 8, 1995.

Kaplan preps for CD–ROM release HFN, vol. 69, No. 32, p. 67 Aug. 7, 1995.

Turning SATs into a kind of video game. By M. Putzel. The Boston Globe, Economy, p. 91, City Edition Sep. 15, 1995.

Training the workers who operate the trains. By Butt et al. American Society for Training & Development, Inc., Technical & Skills training, vol. 6, No. 7, p. 14–19 Oct. 1995.

Computer tutors to help you ace the SAT. By Dunkin et al. Business Week, Personal business, education, No. 3444, p. 142, Oct. 2, 1995.

New CD–ROMs aimed at reducing SAT jitters By W. Honan. The Houston Chronicle, section a, p. 6, 2 Star Edition Oct. 8, 1995.

Test–preparation software scores big. By V. Marion. Los Angeles Times, Business section, part D, p. 7, financial desk, Orange County Edition Nov. 1, 1995.

Multiple choice: Virtual tutors rated coaDec. 3, 2002 options USA Today, Section Life, p. 6D, Final Edition Mar. 21, 1996.

CBT Wintracs, CBT Systems, Ltd. 1994.

Free–Body Diagrams (a Plato Lesson) by Bruce Arne Sherwood, published in the American Journal of Physics, vol. 39, Nos. 1–12, pp. 1199–1202. dated Oct. 1971.

The use of computers in the teaching of Chemistry by Smith et al., published in the Journal of Chemical Education, vol. 51, No. 4, pp. 243–244. dated Apr. 1974.

The Off–Line Plato System by Stanley G. Smith, published in the Journal of Chemical Education, vol. 56, No. 12, pp. 781–782. dated Dec. 1979.

Network Operating Systems by CBT Systems Ltd. dated 1994.

CBTCampus Administrator's Guide, Version 1.01, by CBT Systems. dated Mar. 1998.

* cited by examiner

COMPUTER-AIDED LEARNING SYSTEM AND METHOD

CROSS-REFERENCE TO RELATED APPLICATIONS

This application is a continuation of U.S. patent application Ser. No. 09/037,768, filed on Mar. 10, 1998 U.S. Pat. No. 6,139,330, and incorporated by reference into this application.

This is a continuation-in-part application of the following allowed U.S. patent applications.

Ser. No. 08/618,193, filed on Mar. 19, 1996, U.S. Pat. No. 5,779,486 entitled, Methods and apparatus to assess and enhance a student's understanding in a subject (the "Test Application");

Ser. No. 08/633,582, filed on Apr. 17, 1996, U.S. Pat. No. 5,743,746 entitled, Reward enhanced learning system and method (the "Reward Application");

Ser. No. 08/664,023, filed on May 28, 1996, U.S. Pat. No. 5,727,951 entitled, Relationship-based computer-aided-educational system (the "Relationship Application");

Ser. No. 08/675,391, filed on Jul. 2, 1996, U.S. Pat. No. 5,863,208 entitled, Learning system and method based on review (the "Review Application"); and Ser. No. 08/707,189, filed on Sep. 3, 1996, U.S. Pat. No. 5,743,743 entitled, Learning method and system that restricts entertainment (the "Restrict Application").

All of the above allowed co-pending applications are incorporated by reference into this specification.

BACKGROUND OF THE INVENTION

The present invention relates generally to learning and more particularly to using a computer to enhance learning.

The foundation of a vibrant society depends on skilled workers. To strengthen this foundation, every year the U.S. Government with the private industry have poured billions and billions of dollars to improve on learning systems and methods. Money has been spent in areas such as laboratory facilities, educational materials, teacher recruitment and retention, and others. However, for decades, the way to test a student has remained the same; learning has been treated typically as a reward in itself; a fixed syllabus usually controls the educational process of a subject without taking into account students' individual progress; what students have learnt are rarely selectively reviewed; and typically, the students can access non-educational materials when they should be using computers to learn.

It should be obvious that we need methods and systems that are based on computers to remedy the above deficiencies.

SUMMARY OF THE INVENTION

In one embodiment, the present invention provides a learning method and system that assess and enhance a student's or a user's understanding in a subject. Based on the user's understanding, individually-tailored tests are generated, whose difficulties can be geared towards the user's level of understanding in the subject. The user not only can use the tests to prepare for an examination, but can also use the tests to learn the subject.

In another embodiment, the invented method and system are based on the latest test results from the latest test taken by the user on the subject, which can be divided into line-items. Each line-item covers one area in the subject. In yet another embodiment, at least one line-item is more difficult than another line-item. The latest test includes questions from different line-items.

In one embodiment, the invented system includes a score generator coupled to a recommendation generator. In one embodiment, the recommendation generator includes an inference engine; and in another embodiment, the recommendation generator includes a pre-requisite analyzer. The recommendation generator can be coupled to a report generator and a question generator.

In one embodiment, the score generator accesses the user's latest test result and his prior-to-the-latest test results from a storage medium to generate an overall score for each set of questions related to the same line-item. In one embodiment, the prior-to-the-latest test results are test results from the test immediately before the latest test. In another embodiment, each overall score reflects the user's degree of forgetfulness as a function of time for that group of questions. Based on the calculated overall scores, the score generator updates information in the storage medium to include the latest test results.

Both the pre-requisite analyzer and the inference engine in the recommendation generator can generate recommendations based on the user's test results. The prerequisite analyzer accesses pre-requisite rules, which, based on the complexity levels of the line items, determines a complexity-hierarchy among the line-items. Then, applying the complexity-hierarchy to the test results, the pre-requisite analyzer determines the user's level of understanding in the subject to provide recommendations for the user which, for example, can be providing suggestions to the user as to the line-item to work on.

The inference engine accesses a set of relationship rules that define relationship among the line items and the subject. Then applying the set of relationship rules to the user's test results, the inference engine determines the user's level of understanding in the subject to provide recommendations for the user.

If there is any conflict among one or more relationship rules with the contents in the test results, or if there is any conflict among two or more relationship rules, the inference engine can resolve it. Resolving such conflicts helps to ensure a consistent assessment of the user's understanding in the subject.

In one embodiment, the report generator accesses a report format. Based on the recommendations and the report format, the report generator generates a report, which can provide assessment of the user's understanding in line-items of the latest test and the prior-to-the-latest tests, and which can provide action items to improve on the user's understanding in the subject.

The question generator, based on the recommendations, generates a number of questions, which, in another embodiment, can be categorized into at least two line items—one being the one suggested by the recommendations, and the other being different from the one suggested by the recommendations. The user can take this new set of questions to further enhance his understanding in the subject.

In one embodiment, the invented system and method enhance a user's understanding in a subject through associating the subject's different areas that the user has studied.

The subject can be divided into line-items and relationship-items. Each relationship-item covers areas that relate two or more items. The items include learnt and un-learnt items, with a learnt item being an item that the user has achieved a preset level of learning, and with an un-learnt item being an item that the user has not yet achieved a preset level of learning.

In one embodiment, the recommendation generator also selects and classifies the items. That embodiment includes a learning-material generator for generating learning materials for the user.

In one embodiment of the invented method, first, the recommendation generator selects one un-learnt item. After the selection, the learning-material generator generates learning materials for the user to learn the selected item, and the system assesses the user's learning progress in the selected item. If the assessment on the selected un-learnt item is satisfactory, then the recommendation generator classifies one or more relationship-items to be learnt as un-learnt items, with each classified relationship-item relating the selected item with one or more learnt items. The recommendation generator can also re-classify the selected item as a learnt item. Then, another un-learnt item can be selected, which can be a line-item, or a relationship-item. The process can continue on until all of the items have been learnt. At that point, the user has mastered the subject.

There are different ways for the recommendation generator to select an un-learnt item. In one embodiment, the recommendation generator selects an un-learnt line-item or an un-learnt relationship-item, depending on a value set by an instructor. If the un-learnt item is a line-item, the process to select a line-item can be based on the difficulty level of the line-item; if the un-learnt item is a relationship-item, the selection process can be based on the difficulty level of the relationship-item, the time the relationship-item was classified as an un-learnt item, and/or whether the user has previously failed to learn the relationship-item.

For the learning materials, in one embodiment, the learning material is includes questions. In another embodiment, the learning material does not include questions.

One embodiment of the invented system and method provide users dynamic reviews. After a user has learnt certain areas in a subject, summarized learning materials on those areas can be selectively generated for the user so as to reinforce the user's learning in the subject through reviews. Unlike prior systems, the reviews in the present invention can be dynamic; they can be specifically tailored to the needs of individual users, or the characteristics of the subject.

In one embodiment, the present invention selects an un-learnt item, and generates detailed learning materials for it. Then a learnt item is selected, for example, based on one or more learnt-item-selection rules, depending on factors such as the time elapsed from the time when the user learnt that item, the level achieved by the user in learning that item, its difficulty level, whether that learnt item is related to the selected un-learnt item, and whether that learnt item has been selected before. Then, the invention generates summarized-learning materials on the selected learnt item for the user to review.

Different materials are applicable for learning. For example, the summarized-learning materials may or may not include questions.

For an un-learnt item, after presenting the generated learning material to the user, the present invention can assess the user's understanding in the item. If the assessment is satisfactory, the un-learnt item can be re-classified as a learnt item.

In another embodiment, the present invention accesses an item probability value to select an item. If the item is an un-learnt item, the invention can generate detailed learning materials for the user; and if the user is successful in learning the materials, the invention can re-classify the item as a learnt item. If the item is a learnt item, the invention can generate summarized learning materials for the user. The invention then can repeat and select another item.

In one embodiment, the present invention enriches a user's learning process through individualizing rewards. The invention allows an instructor or a user to set when and what to reward. The invention also allows a user or the user to delay receiving the reward.

In one embodiment, the invented system teaches the user a subject. The subject is divided into line-items, with at least one line-item being more difficult than another line-item. The instructor, such as the user's teacher, guardian or parent, enters his password into the invented system. If the password matches the instructor's password stored in the system, the instructor has gained access into the system, and can set each line-item where there should be a milestone. The system also can provide a list of pre-selected rewards for the instructor to pick the reward at each milestone. The list or a part of the list can depend on the user's preference. The system can then generate a milestone/reward table, capturing the instructor's inputs.

In one embodiment, the recommendation generator accesses the table, and determines if the user has reached any one of the milestones set by the instructor. This determination process can be accomplished in a number of ways; for example, it can be done through one or more rules pre-stored in the system. Such information can then be transmitted to a reward determinator.

The reward determinator based on the information in the reward table can determine the type of reward for the user who has reached a milestone. In one embodiment, there are two types of rewards. The first type is a point system, and the second type is an actual reward. The user can accumulate points or get an actual reward. It would be up to the user to decide. If the user's preference is to pick an actual reward, the user can postpone receiving the reward. If the user's preference is to pick the point system, his points can be accumulated as he gets more points through reaching more milestones.

In one embodiment, the report generator accesses the user's preference and the milestone reached by the user from the reward determinator. The generator stores the milestone-reached in the storage medium, and accesses from the storage medium the history of the milestones reached by the user. In one embodiment, based on the accessed information, a report is generated every time the user reaches a milestone. In another embodiment, the instructor can query the report generator to find out about the user's performance. Based on the report, if the user picks points as rewards, then based on the accumulated points, rewards can be set by the instructor accordingly.

If the user does not want to postpone getting the reward, a reward generator generates the reward for the user. Depending on the type of reward, in one embodiment, the reward generator accesses the reward from a reward storage medium; and in another embodiment, the reward generator accesses the reward from a network.

After the user has claimed the reward, the system can ask for the user's feedback as to his interest in the reward. This information is also sent to the report generator to be presented in the report so that the instructor knows whether she should adjust the rewards for future milestones.

If the user has postponed receiving his reward and later decides to re-claim it, he can enter his password into the system. If the password matches the user's password stored in the system, the user can re-claim his postponed rewards.

In one embodiment, the invention provides rewards when the user has demonstrated understanding in the subject through tests, not just when the system has presented instructional materials. That embodiment requires feedback from the user, with rewards reflecting on the user's understanding.

In one embodiment, the invented method and system help a user focus on study materials by restricting him from freely enjoying entertainment materials on the computer. With such an invention, the user is not distracted by entertainment materials on the computer when he should be working on the study materials. Even if he wants to play, he has to finish studying first.

In one embodiment, the entertainment materials are presented through an entertainment program, and the study materials are presented through a study program.

In one embodiment, the invented system includes an access filter between the programs and a device. The entertainment program needs the device to entertain. A controller controls the access filter to automatically restrict the coupling between the device and the entertainment program, but simultaneously allow the coupling between the device and the study program.

Different entertainment materials typically require different types of devices to entertain. Some examples of devices required by entertainment materials include speakers, a position-pointing device such as a joy-stick, an output device, a storage medium and a circuit board. The circuit board can be used to couple to video-signals, audio-signals or other digital or analog signals. The video-signals can be television signals.

In one embodiment, the access filter includes a device driver.

Under a predetermined condition, the controller removes the restriction automatically to allow the device to couple to the entertainment program. This can be done through a token system. Under the predetermined condition, the user is given a token, which the user can use to remove the restriction. With the restriction removed, the user can enjoy the entertainment materials.

These predetermined condition can be based on one or more factors, such as the amount of time the user has been working on the study materials, the user's performance in the study materials, and the time of day. In one embodiment, one predetermined condition is a user has claimed a corresponding reward.

Other aspects and advantages of the present invention will become apparent from the following detailed description, which, when taken in conjunction with the accompanying drawings, illustrates by way of example the principles of the invention.

DETAILED DESCRIPTION OF THE INVENTION

Figure 1:
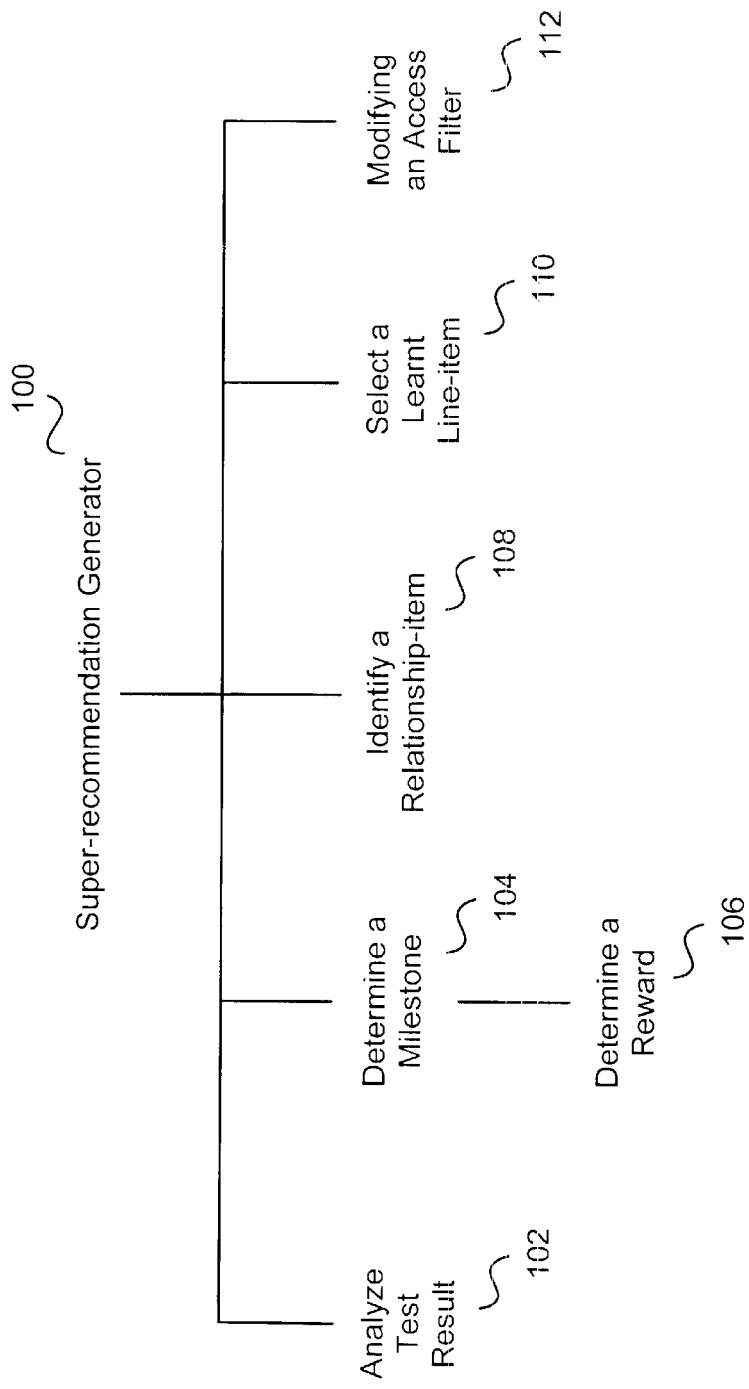
FIG. 1 illustrates one embodiment of the present invention. However, those skilled in the art will readily appreciate that the detailed description given herein with respect to the figure is for explanatory purposes as the invention extends beyond these limited embodiments.

FIG. 1 shows one embodiment of the invention including a super-recommendation generator 100 for implementing a computer-aided learning method to help a student or a user learn a subject. The generator 100 in general is for enhancing the learning experience of the user, and can be implemented in software, firmware, hardware or some combination of the above.

In one embodiment, the subject can be divided into items, including one or more relationship-items, with each relationship-item relating two or more items. The items can include learnt and un-learnt items, with a learnt item being an item that the user has achieved a preset level of learning, and with an un-learnt item being an item that the user has not yet achieved a preset level of learning.

In one embodiment, the super-recommendation generator 100 performs a number of functions, including the following:

assessing a user's understanding in a subject as, for example, described in the Test Application;

rewarding the user who has reached one or more milestones in the subject as, for example, described in the Reward Application;

furthering the user's understanding in the subject through relationship learning, as, for example, described in.the Relationship Application;

reinforcing the user's understanding in the subject through reviews, as, for example, described in the Review Application; and restricting the user from enjoying entertainment materials under certain condition, with the entertainment material requiring a device to fulfill its entertainment purpose, as, for example, described in the Restrict Application.

One embodiment of the super-recommendation generator is configured to perform the following operations:

analyzing (102) the user's prior-to-the-latest and the latest test results to assess the user's understanding in the subject, as, for example, described in the Test Application;

determining (104) whether the user has reached a milestone, as, for example, described in the Reward Application;

determining a reward (106) for the user that has reached a milestone, with the reward depending on the user's preference, as, for example, described in the Reward Application;

identifying (108) a relationship-item to be learnt, with the identified relationship-item relating an item and a learnt item, as, for example, described in the Relationship Application;

selecting (110) a learnt item to be reviewed, as described, for example, in the Review Application; and modifying (112) an access filter to restrict coupling between the device and the entertainment materials, with the restriction removed to allow coupling between the device and the entertainment materials under a predetermined condition.

In another embodiment, the super-recommendation generator is configured to perform only some of the operations, with the subject categorized accordingly. For example, the generator 100 is configured not to perform the function of modifying an access filter. In another example, the generator 100 is configured to assess (102), identify a relationship-item (108) and reinforce through reviews (110). In yet another example, the generator 100 is configured to perform similar functions as the previous example, except for the function of assessment, in which the generator 100 analyzes the user's test results using a set of analysis rules to determine the user's understanding level in the subject. In a further example, the super-recommendation generator is configured to assess (102), determine (104) if the user has reached a milestone, and determine (106) a reward; for this example, the subject can be categorized to include one or more milestone.

Note that in one embodiment, computer can be defined as a machine that can perform a computable function, which can be defined as a function that can be performed by a Turing machine or its equivalence.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer-implemented learning system that
   assesses a user's understanding in a subject through testing the user,
   furthers the user's understanding in the subject through identifying for learning at least an area related to another area of the subject that the user has been assessed to have learnt, and
   reinforces the user's understanding in the subject through reviewing an area that the user has been assessed to have learnt,
   with the subject divided into areas, including one or more relationship-items,
   with the areas including learnt and un-learnt areas, with a learnt area being an area that the user has been assessed to have learnt, and an un-learnt area being an area that the user has not been assessed to have learnt, and
   with each relationship-item relating two or more areas, the system comprising a first computer being configured to:
      present materials on a relationship-item to be learnt after the relationship-item has been identified by another computer, which is coupled, through a network, to the first computer, with the identified relationship-item relating an area and a learnt area of the subject; and
      present materials on a learnt area to be reviewed after the learnt area has been selected by the another computer;
   wherein a report can be presented on an assessment of the user's understanding in more than one area of the subject, based on analyzing the user's prior-to-the-latest and the latest test results by the another computer, with at least one test assessing the user's understanding in at least some materials presented to the user by the first computer, and with the two tests assessing understanding in different materials.

2. A computer-implemented learning system that
   furthers a user's understanding in the subject through identifying for learning at least an area related to another area of the subject that the user has been assessed to have learnt, and
   reinforces the user's understanding in the subject through reviewing an area that the user has been assessed to have learnt,
   with the subject divided into areas, including one or more relationship-items,
   with the areas including learnt and un-learnt areas, with a learnt area being an area that the user has been assessed to have learnt, and an un-learnt area being an area that the user has not been assessed to have learnt,
   and with each relationship-item relating two or more areas, the system comprising a first computer being configured to:
      present materials on a relationship-item to be learnt after the relationship-item has been identified by another computer, which is coupled, through a network, to the first computer, with the identified relationship-item relating an area and a learnt area of the subject; and
      present materials on a learnt area to be reviewed after the learnt area has been selected by the another computer; wherein before a learned area is selected for review, an un-learned area can be selected for the user to learn; and materials for reviewing a learnt area are more concise than materials for that area to be presented to a user who has not been assessed to have learnt that area.

3. A computer-implemented learning system that
   assesses a user's understanding in a subject through testing the user, and rewards the user who has achieved one or more objectives in the subject,
   the system comprising a first computer being configured to present materials related to a reward for the user that has achieved an objective in learning the subject, based on determining the reward and determining the user having achieved the objective, by another computer, which is coupled, through a network, to the first computer, with the reward depending on a preference of the user;
      wherein a report can be presented on an assessment of the user's understanding in more than one area of the subject, based on analyzing the user's prior-to-the-latest and the latest test results by the another computer, with at least one test assessing the user's understanding in at least some materials presented to the user by the first computer, and with the two tests assessing understanding in different materials.

4. A computer-implemented learning system that
   rewards a user who has achieved one or more objectives in learning a subject, and
   restricts, under certain condition, the user from enjoying certain materials not for learning the subject, with the materials requiring a device to fulfill its enjoyment purpose,
   the system comprising a computer being configured to:
      present materials related to a reward for the user that has achieved an objective in learning the subject, based on determining the reward and determining the user having achieved the objective, with the reward depending on a preference of the user; and
      modify the use of the device when applied to those certain materials not for learning the subject to restrict the user from enjoying those materials, with the modification removed under a predetermined condition.

5. A computer-implemented learning system that reinforces a user's understanding in a subject through reviewing an area that the user has been assessed to have learnt, with the subject divided into areas, including learnt areas and un-learnt areas, with a learnt area being an area that the user has been assessed to have learnt, and an un-learnt area being an area that the user has not been assessed to have learnt, the system comprising a first computer being configured to:
   present materials on a learnt area to be reviewed after the learnt area has been selected and materials retrieved by another computer, which is coupled, through a network, to the first computer;

wherein before a learned area is selected for review, an un-learned area can be selected for the user to learn; and materials for reviewing a learnt area are more concise than materials for that area to be presented to a user who has not been assessed to have learnt that area;

such that although the user has previously been assessed to have learnt an area, that learnt area still might be selected with materials presented for the user so as to reinforce the user's understanding in the subject through reviews.

6. A computer-implemented learning system that rewards a student who has achieved an objective in a subject, which is divided into areas, the system comprising a first computer being configured to:

present materials related to a reward for the user that has achieved an objective in learning the subject, based on determining the reward and determining the user having achieved the objective, by another computer, which is coupled, through a network, to the first computer, with the reward depending on a preference of the user, specifically tailored to the interest of the user.

7. A computer-implemented learning system that assesses a user's understanding in a subject through testing the user, the system comprising a first computer being configured to:

present a report on an assessment of the user's understanding in more than one area of the subject, based on analyzing the user's prior-to-the-latest and the latest test results by another computer, which is coupled, through a network, to the first computer, with at least one test assessing the user's understanding in at least some materials presented to the user by the first computer, and with the two tests assessing understanding in different materials.

8. A computer-implemented teaming system as recited in claim 7, wherein the another computer is further configured to analyze at least one of the two sets of test results, using one or more rules, to determine at least one weakness in the user's understanding on the subject; and provide guidance to the user to target the at least one weakness;

a report, based on the analysis and a report format, regarding the user's understanding in at least two areas of the subject, is allowed to be presented by the first computer;

the another computer is configured to consider at least a preference of the user;

at least a plurality of areas of the subject can be individually accessed via the Internet;

an identifier, which can be entered by the user and which is associated with the user, is stored;

an identifier, which can be entered by a person interested in the user's understanding in the subject and which is associated with the person, is stored;

at least some materials on the user's understanding in the subject is stored in a storage area that has materials regarding the user;

the system allows the person to search for at least some of the materials in the storage area; and the system allows the user to search the storage area for at least some of the materials related to the user, regarding the subject.

9. A computer-implemented learning method regarding learning a subject, which is separated into a plurality of areas, the method comprising:

accessing a learner's results on a test;

analyzing the learner's test results, using one or more rules, to determine at least one weakness in the learner's understanding on the subject; and providing guidance to the learner to target the at least one weakness;

wherein the analysis is performed by a first computing device;

a report, based on the analysis and a report format, regarding the learner's understanding in at least two areas of the subject, is allowed to be presented by a second computing device, which is coupled, through a network, to the first computing device;

the method considers at least a preference of the learner, other than the fact that the learner might prefer to learn the subject;

at least a plurality of areas of the subject can be individually accessed via the Internet;

an identifier, which can be entered by the learner and which is associated with the learner, is stored and can be accessed by a computing device;

an identifier, which can be entered by a person interested in the learner's understanding in the subject and which is associated with the person, is stored and can be accessed by a computing device;

at least some materials on the learner's understanding in the subject is stored in a storage area that has materials regarding the learner;

the method allows the person to search for at least some of the materials in the storage area; and the method allows the learner to search the storage area for at least some of the materials related to the learner, regarding the subject.

10. A method as recited in claim 9 further comprising generating materials for learning the subject.

11. A method as recited in claim 9 further comprising:

identifying a relationship between two areas of the subject based on at least a rule; and applying the identified relationship to the test results to help the learner on the subject.

12. A method as recited in claim 11 wherein for the two areas of the subject, the at least a rule depends on one area being a prerequisite for learning the other area.

13. A method as recited in claim 9 further comprising providing materials related to a reward to the learner under a pre-determined condition, with the reward depending on a preference the learner.

14. A method as recited in claim 9 wherein materials for the learner to learn the subject include materials to refresh the learner in an area that the learner has been assessed to have learnt; wherein before such an area is selected for refreshing, an area that the learner has not been assessed to have learnt, can be selected for the learner; and materials for refreshing an area are more concise than materials for that area to be presented to a learner who has not been assessed to have learnt that area.

15. A method as recited in claim 9 wherein although the analysis determines that the learner is not weak in an area, materials in that area can be presented so as to refresh the learner regarding the subject; wherein before such an area is selected for refreshing, an area that the learner has not been assessed to have learnt, can be selected for the learner; and materials for refreshing an area are more concise than materials for that area to be presented to a learner who has not been assessed to have learnt that area.

16. A method as recited in claim 9 wherein at least a portion of the materials for learner to learn the subject is selected by the learner.

17. A method as recited in claim 9 wherein the at least one weakness in understanding the subject is determined depending on the learner's results in one additional test, with the two tests being administered at separate time frames, with at least one test assessing the learner's understanding in at least some materials presented to the learner by the method, and with the two tests assessing understanding in different materials.

18. A method as recited in claim 17 wherein
both tests include a plurality of questions; and
the two tests are different to prevent the learner from being assessed the same way twice.

19. A method as recited in claim 9 wherein the test can be administered before teaching the learner the subject so as to determine the learner's understanding regarding the subject.

20. A method as recited in claim 9 wherein the method allows the learner to search the storage area for at least some of the materials on the learner's weakness in the subject.

21. A method as recited in claim 9 wherein at least a portion of the materials for the learner to learn the subject is selected by the learner.

22. A method as recited in claim 21 wherein the test can be administered before teaching the learner the subject so as to determine the learner's understanding regarding the subject.

23. A method as recited in claim 22 wherein
materials for the learner to learn the subject include materials in an area of the subject previously presented so as to refresh the learner regarding the subject;
materials for refreshing an area of the subject are more concise than materials previously presented to the learner for that area; and
before such an area is selected for refreshing, materials in an area that have not been previously presented to the learner, can be selected for the learner.

24. A method as recited in claim 22 further comprising retrieving materials for learning the subject.

25. A method as recited in claim 24 further comprising
restricting, under certain condition, the learner from enjoying certain materials not for learning the subject, with those materials requiring a device to fulfill its enjoyment purpose, by modifying the use of the device when applied to those materials to restrict the learner from enjoying those materials, with the modification removed under a predetermined condition.

26. A method as recited in claim 24 further comprising providing materials related to a reward to the learner under a pre-determined condition, with the reward depending on a preference of the learner.

27. A method as recited in claim 24 wherein the method provides wireless access capability.

28. A method as recited in claim 24 wherein the at least one weakness in understanding the subject is determined depending on the learner's results in one additional test, with the two tests being administered at separate time frames, with at least one test assessing the learner's understanding in at least some materials presented to the learner by the method, and with the two tests assessing understanding in different materials.

29. A method as recited in claim 28 wherein
both tests include a plurality of questions; and
the two tests are different to prevent the learner from being assessed the same way twice.

30. A method as recited in claim 22 further comprising:
identifying a relationship between two areas of the subject based on at least a rule; and
applying the identified relationship to the test results to help the learner on the subject.

31. A method as recited in claim 30 further comprising providing materials related to a reward to the learner under a predetermined condition, with the reward depending on a preference of the learner.

32. A method as recited in claim 30 wherein
although the analysis determines that the learner is not weak in an area, materials in that area can be presented so as to refresh the learner regarding the subject;
before such an area is selected for refreshing, an area that the learner has not been assessed to have learnt, can be selected for the learner; and
materials for refreshing an area of the subject are more concise than materials for that area to be presented to a learner who has not been assessed to have learnt that area.

33. A method as recited in claim 30 wherein the at least one weakness in understanding the subject is determined depending on the learner's results on one additional test, with the two tests being administered at separate time frames, with at least one test assessing the learner's understanding in at least some materials presented to the learner by the method, and with the two tests assessing understanding in different materials.

34. A computer-implemented learning method regarding learning a subject, which is separated into a plurality of areas, the method comprising:
presenting, by a first computing device, a report, based on a report format and an analysis on a learner's results on a test, regarding the learner's understanding in at least two areas of the subject;
wherein
the analysis is performed by a second computing device coupled, through a network, to the first computing device;
the analysis is performed, using one or more rules, to determine at least one weakness in the learner's understanding on the subject, with guidance provided to the learner to target the at least one weakness, and with at least a preference of the learner considered, wherein the preference is other than the fact that the learner might prefer to learn the subject;
at least a plurality of areas of the subject can be individually accessed via the Internet;
an identifier, which can be entered by the learner and which is associated with the learner, is stored and can be accessed by a computing device;
an identifier, which can be entered by a person interested in the learner's understanding in the subject and which is associated with the person, is stored and can be accessed by a computing device;
at least some materials on the learner's understanding in the subject is stored in a storage area that has materials regarding the learner;
the method allows the person to search for at least some of the materials in the storage area; and
the method allows the learner to search the storage area for at least some of the materials related to the learner, regarding the subject.

35. A computer readable medium including at least computer program code for learning a subject, which is separated into a plurality of areas, said computer readable medium comprising:
computer program code for accessing a learner's results on a test;

computer program code for analyzing the learner's test results, using one or more rules, to determine at least one weakness in the learner's understanding on the subject;

computer program code for providing guidance to the learner to target the at least one weakness;

computer program code for allowing a computing device coupled through a network to present a report, based on the analysis and a report format, regarding the learner's understanding in at least two areas of the subject;

computer program code for considering at least a preference of the learner, other than the fact that the learner might prefer to learn the subject; and computer program code for storing at least some materials on the learner's understanding in the subject in a storage area that has materials regarding the learner;

wherein at least a plurality of areas of the subject can be individually accessed via the Internet;

an identifier, which can be entered by the learner and which is associated with the learner, is stored and can be accessed by a computing device;

an identifier, which can be entered by a person interested in the learner's understanding in the subject and which is associated with the person, is stored and can be accessed by a computing device;

the person can search for at least some of the materials in the storage area using computer program code for searching; and the learner can search, using computer program code for searching, the storage area for at least some of the materials related to the learner, regarding the subject.

* * * * *

UNITED STATES PATENT AND TRADEMARK OFFICE
CERTIFICATE OF CORRECTION

PATENT NO. : 6,688,888 B1
DATED : February 10, 2004
INVENTOR(S) : Ho et al.

It is certified that error appears in the above-identified patent and that said Letters Patent is hereby corrected as shown below:

Column 9,
Line 36, change "A computer-implemented teaming system" to -- A computer-implemented learning system --

Column 10,
Line 46, change "preference the learner" to -- preference of the learner --
Line 66, change "for learner to learn the subject" to -- for the learner to learn the subject --

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,688,888 B1
DATED : February 10, 2004
INVENTOR(S) : Ho et al.

It is certified that error appears in the above-identified patent and that said Letters Patent is hereby corrected as shown below:

Title page,
Item [63], Related U.S. Application Data,
change "1996, now U.S. Pat. No. 5,779,486, which is a continuation-in-" to
-- 1996, now U.S. Pat. No. 5,779,486, and a continuation-in- --;
change "now Pat. No. 5,743,746, which is a continuation-in-part of" to -- now Pat. No. 5,743,746, and a continuation-in-part of --;
change "No. 5,727,951, which is a continuation-in-part of application" to
-- No. 5,727,951, and a continuation-in-part of application --
change "208, which is a continuation-in-part of application No." to -- 208, and a continuation-in-part of application No. --

Column 9,
Line 36, change "A computer-implemented teaming system" to -- A computer-implemented learning system --

Column 10,
Line 46, change "preference the learner" to -- preference of the learner --
Line 66, change "for learner to learn the subject" to -- for the learner to learn the subject --

Signed and Sealed this

Second Day of November, 2004

JON W. DUDAS
*Director of the United States Patent and Trademark Office*